United States Patent
Moon et al.

(10) Patent No.: US 9,541,780 B2
(45) Date of Patent: Jan. 10, 2017

(54) CURVED SURFACE BACKLIGHT UNIT AND CURVED SURFACE DISPLAY DEVICE INCLUDING THE SAME

(71) Applicant: LG Display Co., Ltd., Seoul (KR)

(72) Inventors: Chang Yul Moon, Paju-Si (KR); Young Hun Jeong, Paju-Si (KR)

(73) Assignee: LG Display Co., Ltd., Seoul (KR)

( * ) Notice: Subject to any disclaimer, the term of this patent is extended or adjusted under 35 U.S.C. 154(b) by 46 days.

(21) Appl. No.: 14/714,143

(22) Filed: May 15, 2015

(65) Prior Publication Data

US 2015/0378188 A1 Dec. 31, 2015

(30) Foreign Application Priority Data

Jun. 25, 2014 (KR) ........................ 10-2014-0078121

(51) Int. Cl.
 *G02F 1/1333* (2006.01)
 *F21V 8/00* (2006.01)
 *G02F 1/1335* (2006.01)

(52) U.S. Cl.
 CPC ........... *G02F 1/1333* (2013.01); *G02B 6/0045* (2013.01); *G02B 6/0053* (2013.01); *G02F 1/133606* (2013.01); *G02F 1/133611* (2013.01); *G02F 2001/133607* (2013.01)

(58) Field of Classification Search
 CPC .............................. G02F 1/1333; G02B 6/0053
 See application file for complete search history.

(56) References Cited

U.S. PATENT DOCUMENTS

| | | | | |
|---|---|---|---|---|
| 7,188,989 B2* | 3/2007 | Miyashita | ............. | G02B 6/002 362/621 |
| 7,457,510 B2* | 11/2008 | Lee | ....................... | G02B 6/0036 362/612 |
| 7,834,962 B2* | 11/2010 | Satake | ............. | G02F 1/133305 349/110 |
| 8,944,641 B2* | 2/2015 | Kasai | ................ | G02F 1/133603 362/217.05 |
| 2007/0146569 A1* | 6/2007 | Nouchi | ................ | G02B 6/0088 349/58 |
| 2009/0135623 A1* | 5/2009 | Kunimochi | ......... | G02B 6/0016 362/608 |
| 2010/0238367 A1* | 9/2010 | Montgomery | ......... | G02B 6/005 349/15 |
| 2011/0228560 A1* | 9/2011 | Chang | .................. | G02B 6/0018 362/609 |
| 2012/0275192 A1* | 11/2012 | Wakamura | ........... | G02B 6/0036 362/613 |
| 2013/0039094 A1* | 2/2013 | Kolb | ....................... | B29C 41/24 362/618 |
| 2014/0098563 A1* | 4/2014 | Kim | ..................... | G02B 6/0076 362/606 |
| 2015/0323712 A1* | 11/2015 | Lim | ...................... | G02B 5/0263 428/167 |
| 2016/0195772 A1* | 7/2016 | Lee | .................. | G02F 1/133602 349/61 |
| 2016/0216432 A1* | 7/2016 | Kim | ..................... | G02B 6/0035 |

* cited by examiner

*Primary Examiner* — Timothy L Rude
(74) *Attorney, Agent, or Firm* — Fenwick & West LLP

(57) ABSTRACT

A curved surface backlight unit is disclosed which includes: a light source; a curved surface light guide plate disposed parallel to the light source; first patterns on one surface of the light guide plate; a reflection plate disposed under the light guide plate; optical sheets disposed on the light guide plate; and second patterns formed on one surface of at least one of the optical sheets.

20 Claims, 5 Drawing Sheets

| | SA1 | | | | CA | SA2 | | | |
|---|---|---|---|---|---|---|---|---|---|
| POSITION | 1 | 2 | 3 | 4 | ~ | 38 | 39 | 40 | 41 |
| DENSITY | 60% | 70% | 80% | 90% | | 90% | 80% | 70% | 60% |
| RELATED ART PATTERN | 6.4 | 6.7 | 7.0 | 7.3 | | 41.2 | 43.1 | 45.0 | 46.9 |
| FIRST PATTERN | 3.9 | 4.7 | 5.6 | 6.6 | | 37.1 | 34.5 | 31.5 | 28.1 |

CURVED SURFACE BACKLIGHT UNIT AND CURVED SURFACE DISPLAY DEVICE INCLUDING THE SAME

The present application claims priority under 35 U.S.C. §119(a) of Korean Patent Application No. 10-2014-0078121 filed on Jun. 25, 2014, which is hereby incorporated by reference in its entirety.

BACKGROUND

Field of the Disclosure

The present application relates to a curved surface display device adapted to prevent light leakage.

Description of the Related Art

As the information society spreads, the requirements for display devices are varied and gradually increasing. In accordance therewith, a variety of flat panel display devices with features such as slimness, light weight, low power consumption and so on are being researched. Flat panel display devices including liquid crystal display (LCD) devices, plasma display panels (PDP), organic light emitting diode (OLED) display device and so on, have been researched.

Nowadays, the screen of the LCD device becomes larger. The large-sized screen of the LCD device increases a viewing distance difference between a central region and one of side edge regions of the screen of the LCD device with respect to a viewing position. To address this matter, a curved surface LCD device allowing an LCD panel to be curved in a constant curvature is being actively developed.

However, the curvature of the curved LCD panel can increase or decrease by an external pressure. Due to this, brightness of the LCD panel can be non-uniform.

Also, if a stress is applied to the LCD panel when bending the LCD panel, liquid crystal alignment can be distorted (or twisted) in the curved regions. Due to this, light can leak in the curved regions. Particularly, the light leakage is hardly revealed when a white pattern (or image) is displayed, but the light leakage is largely generated in four corner regions when a black pattern (or image) is displayed.

BRIEF SUMMARY

Accordingly, embodiments of the present application are directed to a curve surface display device that substantially obviates one or more of problems due to the limitations and disadvantages of the related art.

The embodiments relate to providing a curved surface backlight unit and a curved surface display device with the same which are adapted to maintain brightness uniformity and prevent light leakage.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

In order to achieve the above-mentioned subject matter, a curved surface backlight unit according to an aspect of the present embodiment includes: a light source; a curved surface light guide plate disposed parallel to the light source; first patterns on one surface of the light guide plate; a reflection plate disposed under the light guide plate; optical sheets disposed on the light guide plate; and second patterns formed on one surface of at least one of the optical sheets, wherein the light guide plate is defined into a central area and side areas, the first patterns are more densely formed in the central area rather than the side areas, and the second patterns are arranged in such a manner that brightness in side areas of the optical sheet corresponding to the side areas of the light guide plate becomes about 70%~90% compared to that in a central area of the optical sheet corresponding to the central area of the light guide plate.

A curved surface display device according to another aspect of the present embodiment includes: a curved surface liquid crystal display panel; and a curved surface backlight unit disposed under the curved surface liquid crystal panel and configured to apply light to the curved surface liquid crystal panel, wherein the curved surface backlight unit includes a light source, a curved surface light guide plate disposed parallel to the light source, first patterns on one surface of the light guide plate, a reflection plate disposed under the light guide plate, optical sheets disposed on the light guide plate, and second patterns formed on one surface of at least one of the optical sheets, and wherein the light guide plate is defined into a central area and side areas, the first patterns are more densely formed in the central area rather than the side areas, and the second patterns are arranged in such a manner that brightness in side areas of the optical sheet corresponding to the side areas of the light guide plate becomes about 70%~90% compared to that in a central area of the optical sheet corresponding to the central area of the light guide plate.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
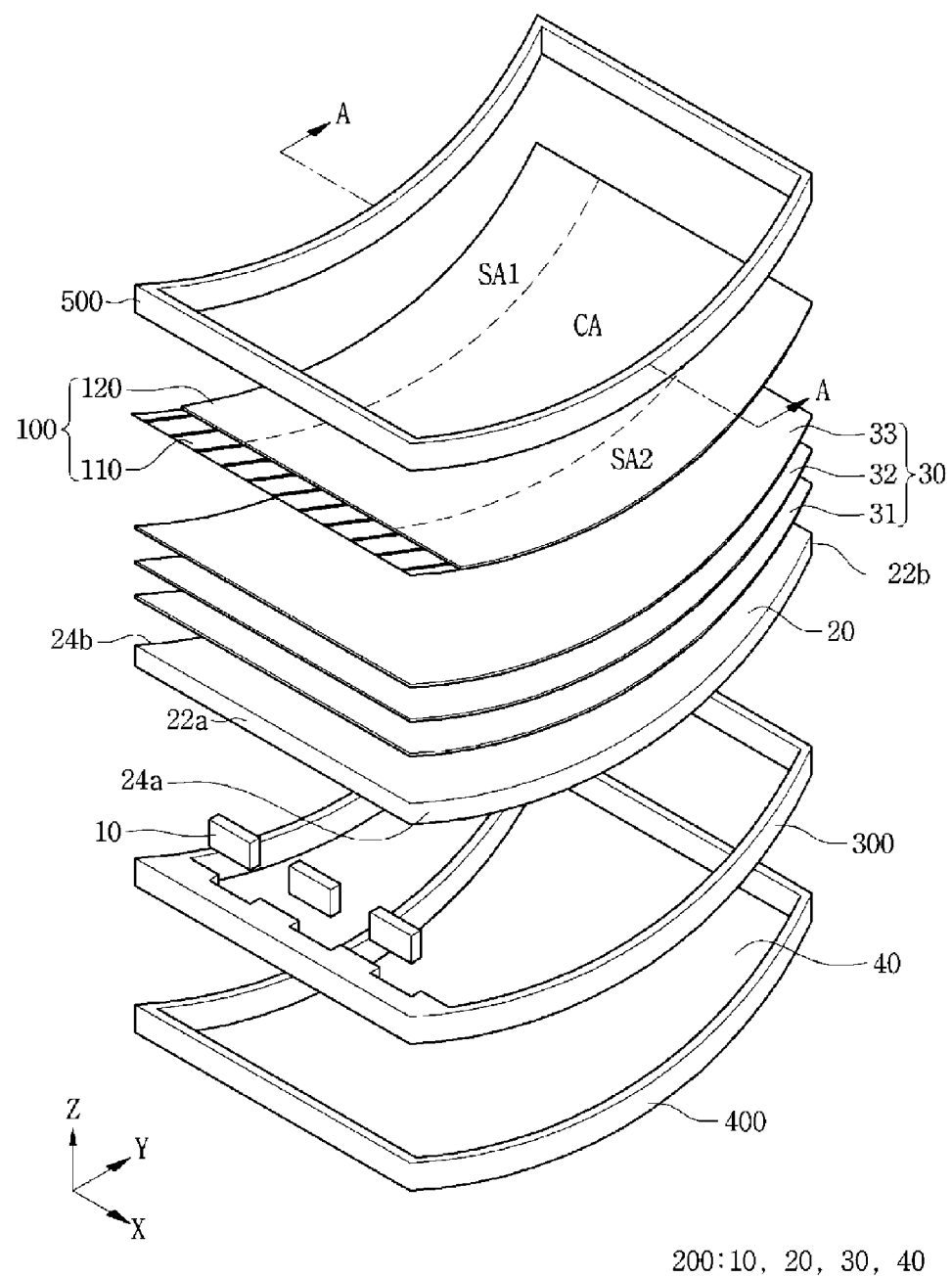
FIG. 1 is an exploded perspective view schematically showing a curved surface display device according to an embodiment of the present disclosure.

Reference will now be made in detail to embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. In the drawings, the size, thickness and so on of a device can be exaggerated for convenience of explanation. Wherever possible, the same reference numbers will be used throughout this disclosure including the drawings to refer to the same or like parts.

Figures 2, 3:
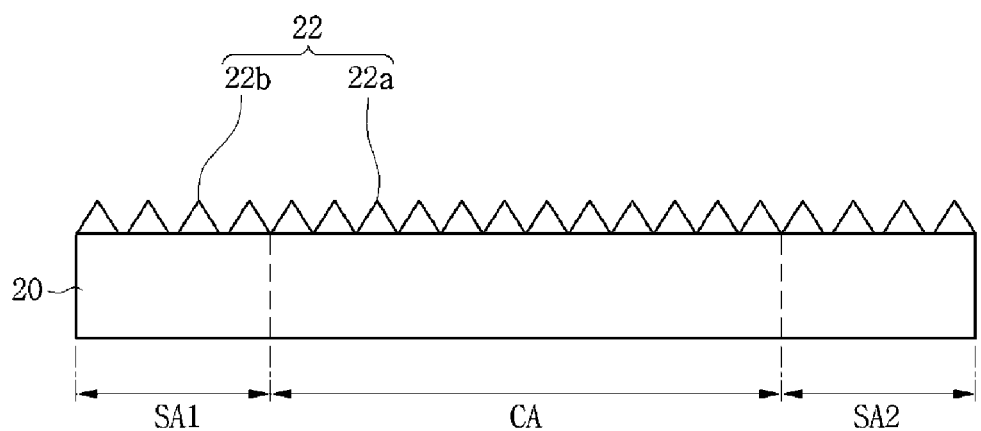
FIG. 2 is a cross-sectional view showing a light guide plate which is included in a curved surface display device according to an embodiment of the present disclosure.
FIGS. 3 and 4 are data sheets illustrating variation of pattern density in a light guide plate which is included in the curved surface display device according to an embodiment of the present disclosure.
Figure 4:
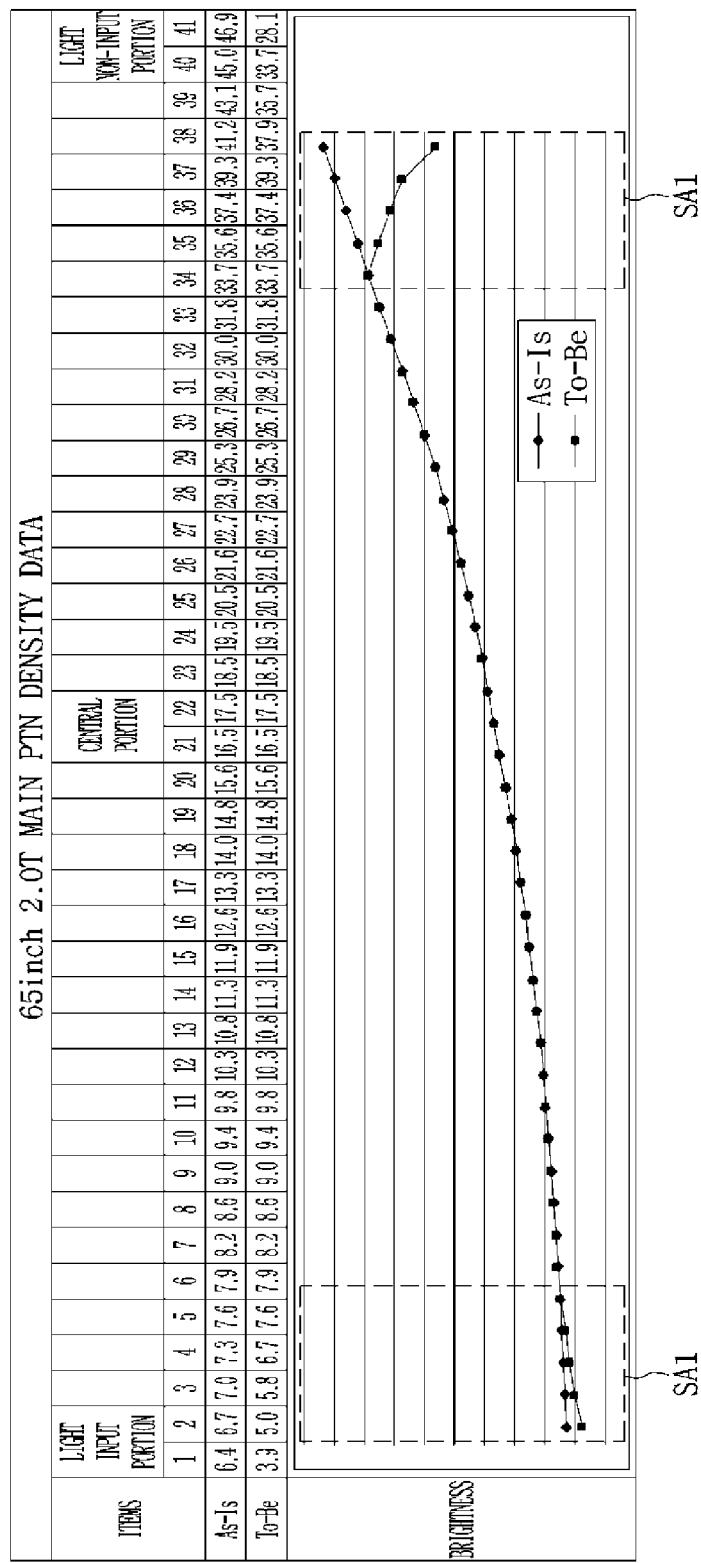
Figure 5:
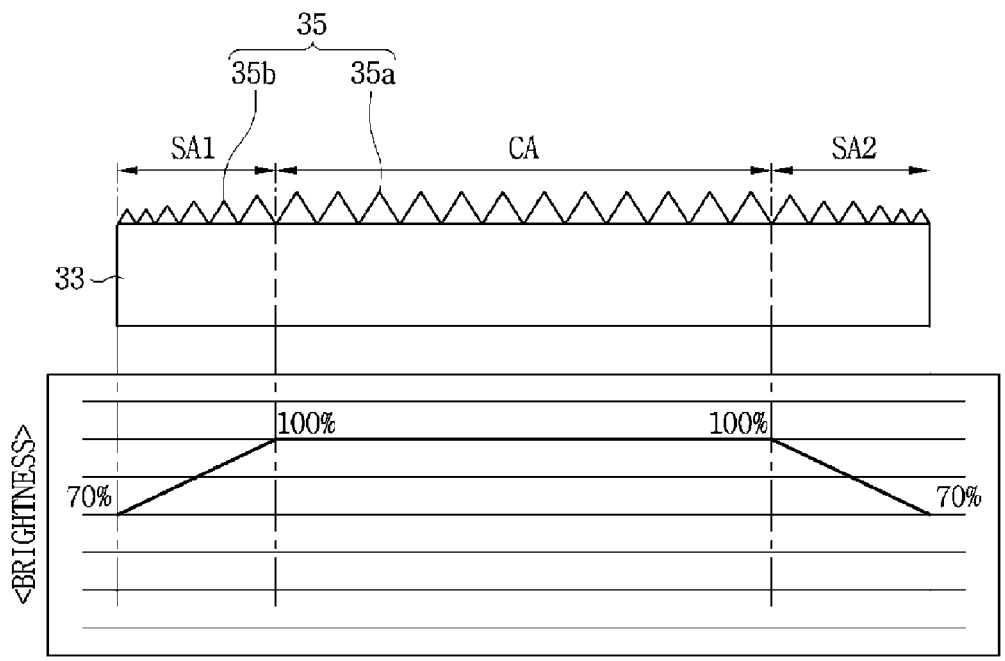
FIG. 5 includes a cross-sectional view showing a prism sheet, which is included in a curved surface display device according to an embodiment of the present disclosure, and a data sheet illustrating a brightness characteristic of the prism sheet.
Figure 6:
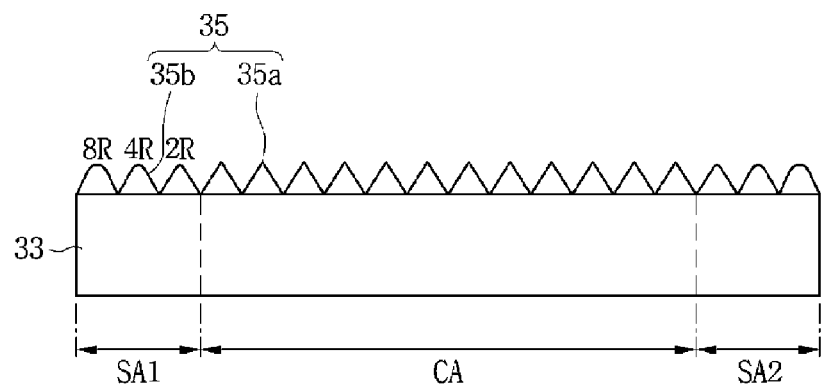
FIGS. 6 through 8 are cross-sectional views showing modified examples of a prism sheet which can be used in a curved surface display device according to an embodiment of the present disclosure.
Figure 7:
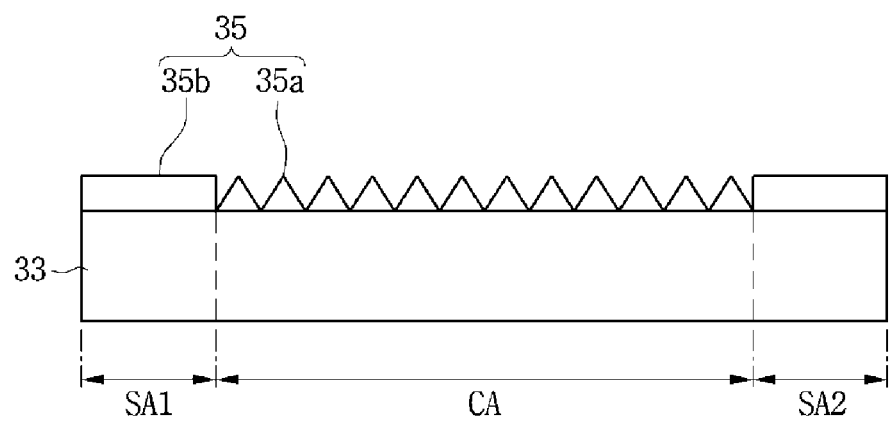
Figure 8:
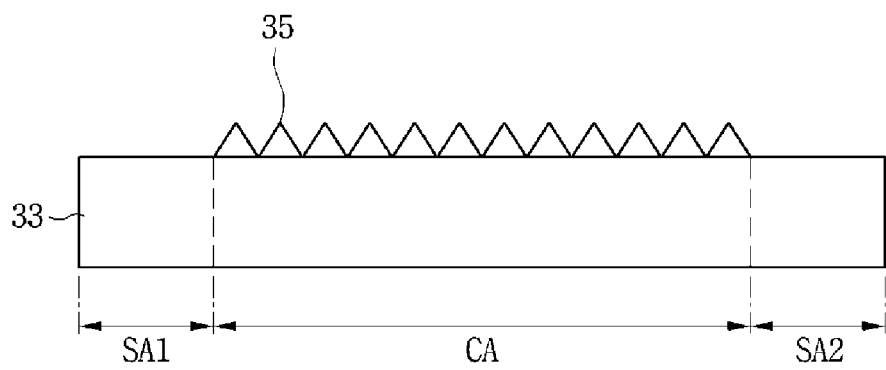

FIG. 1 is an exploded perspective view schematically showing a curved surface display device according to an embodiment of the present disclosure. FIG. 2 is a cross-sectional view showing a light guide plate which is included in a curved surface display device according to an embodiment of the present disclosure. FIGS. 3 and 4 are data sheets illustrating variation of pattern density in a light guide plate which is included in the curved surface display device according to an embodiment of the present disclosure. FIG. 5 includes a cross-sectional view showing a prism sheet, which is included in a curved surface display device according to an embodiment of the present disclosure, and a data sheet illustrating a brightness characteristic of the prism sheet. FIGS. 6 through 8 are cross-sectional views showing modified examples of a prism sheet which can be used in a curved surface display device according to an embodiment of the present disclosure.

Referring to FIG. 1, a curved surface display device can include a curved surface liquid crystal panel 100 and a curved surface backlight unit 200 configured to apply light to the curved surface liquid crystal panel 100. Also, the curved surface display device can include a guide panel 300, an upper cover 500 and a lower cover 400 which receives and fastens the curved surface liquid crystal panel 100 and the curved surface backlight unit 200.

The curved surface liquid crystal panel 100 can be flexible. Also, the curved surface liquid crystal panel 100 can become a bent shape with a single curvature. Alternatively, the curved surface liquid crystal panel 100 can become a bent shape with multiple curvatures.

Such a curved surface liquid crystal panel 100 can have side surfaces with a constant curvature. Each of the side surfaces of the curved surface liquid crystal panel 100 can become a bent (or curved) shape with a constant curvature.

The curved surface liquid crystal panel 100 can be defined into a central area CA and side areas SA1 and SA2, which are adjacent to the side surfaces of the curved surface liquid crystal display panel, and are opposite to each other. The side areas SA1 and SA2 can include a first side area SA1 adjacent to one side surface of the curved surface liquid crystal panel 100, and a second side area SA2 adjacent to the other side surface of the curved surface liquid crystal panel 100. The central area CA can be positioned between the first side area SA1 and the second side area SA2.

Also, the curved surface liquid crystal panel 100 includes a thin film transistor (TFT) substrate 110 and a color filter (CF) substrate 120 disposed above the TFT substrate 110.

The TFT substrate 110 includes TFTs arranged in a matrix shape. Each of the TFTs includes a gate electrode connected to a respective gate line, a source electrode connected to a respective data line, and a drain electrode connected to a respective pixel electrode. The CF substrate 120 includes color filters and a common electrode on its one surface. The common electrode is formed from a transparent conductive material such as indium-tin-oxide (ITO), indium-zinc-oxide (IZO) or others.

The curved surface liquid crystal panel 100 can further include driver IC (integrated circuit) chips (not shown) on at least one edge of the TFT substrate 110. The driver IC chips can generate data signals, gate driving signals and a plurality of timing signals. The data signals and the gate driving signals are used to drive the curved surface liquid crystal panel 100. The plurality of timing signals are used to control timings of applying the data signals and the gate driving signals. Such driver IC chips apply the data signals and the gate driving signals to the data lines and the gate lines on the curved surface liquid crystal panel 100.

The curved surface backlight unit 200 is disposed under the curved surface liquid crystal panel 100. Also, the curved surface backlight unit 200 is used to apply light to the curved surface liquid crystal panel 100.

Such a curved surface backlight unit 200 can include light sources 10 and a light guide plate 20 disposed parallel to the light source 10. Also, the curved surface backlight unit 200 can include a reflection plate 40 disposed under the light guide plate 20, and optical sheets 30 disposed on the light guide plate 20.

The light source 10 is used to generate light. As the light source 10, LED (light emitting diode) element can be used.

In detail, the light source 10 can include red, green and blue LEDs each emitting mono color light such as red light, green light or blue light. Alternatively, the light source 10 can include white LEDs each emitting white light. The LEDs used in the light sources 10 can become side view type elements.

If the light source 10 includes mono color LED elements each emitting mono color light, red, green and blue LED elements corresponding to the mono color LED elements are arranged in a fixed interval. In this case, mono color lights (i.e., red, green and blue lights) emitted from the mono color LED elements are mixed with one another, thereby generating white light. As such, white light can be applied to the curved surface liquid crystal panel 100.

Alternatively, the light sources 10 can include a plurality of white LED elements each emitting white light. In this case, the plurality of white LED elements is arranged in a fixed interval. Therefore, white light can be applied to the curved surface liquid crystal panel 100.

The white LED element can be configured with a blue LED element emitting blue light and a fluorescent substance which absorbs mono color (i.e., blue) light emitted from the blue LED element and generates yellow light. Such a white LED element generates white light by mixing mono color (blue) light emitted from the blue LED element and yellow light generated in the fluorescent substance. As such, white light can be applied to the curved surface liquid crystal panel 100.

The light source 10 is disposed only by one side of the light guide plate 20 as shown in the drawing, but it is not limited to this. Alternatively, the light source 10 can be also disposed by the other side of the light guide plate 20.

The light guide plate (LGP) 20 is used to guide light emitted from the light source 10 toward the curved surface liquid crystal panel 100. Light input through one side surface of the light guide plate 20 is repeatedly refracted and reflected by scatterers (or an diffusing agent) included in the inside of the light guide plate 20 and progresses up to the other side surface of the light guide plate 20 before being output in an upward direction of the light guide plate 20. Such a light guide plate 20 is used to convert light of a dottedly or linearly optical distribution into light of a two-dimensionally optical distribution.

Also, the light guide plate 20 can include not only a first primary side surface 22a and a second primary side surface 22b opposite to each other, but also a first secondary side surface 24a and a second secondary side surface 24b which are perpendicular to the first primary side surface 22a. The first primary side surface 22a can be a light input surface. Such a first primary side surface 22a can be formed in a flat shape. Each of the first secondary side surface 24a and the second secondary side surface 24b can be formed in a bent shape with a constant curvature.

Moreover, the light guide plate 20 can be defined into a central area CA, a first side area SA1 and a second side area SA2. The central area CA, the first side area SA1 and the second side area SA2 of the light guide plate 20 can be corresponding areas to the central area CA, the first side area SA1 and the second side area SA2 of the curved surface liquid crystal panel 100.

The first side area SA1 of the light guide plate 20 can be an area adjacent to the first second side surface 24a of the light guide plate 20. The second side area SA2 of the light guide plate 20 can be an area adjacent to the second secondary side surface 24b of the light guide plate 20. The central area CA can be an area between the first side area SA1 and the second side area SA2.

In reference to FIG. 2, furthermore, the light guide plate 20 can include first patterns 22 formed on its upper surface. The first patterns 22 can be formed to each have a prism pattern (or shape). Alternatively, the first patterns 22 can be formed to have one of a hemisphere pattern (or shape), a peak pattern (or shape) and a polygonal cone pattern (or shape).

The first patterns 22 can be uniformly arranged in the central area CA, the first side area SA1 and the second side area SA2 of the light guide plate 20. The first patterns 22a formed on the central area CA can be arranged in a constant density. Similarly, the first patterns 22b formed on the first side area SA1 and the second side area SA2 can be arranged in a constant density.

The density of the first patterns 22b formed on the first side area SA1 and the second side area SA2 can be higher than that of the first patterns 22a formed on the central area CA. To this end, the first patterns 22b arranged on the first side area SA1 and the second side area SA2 can be separated from one another by a fixed interval.

In this manner, the first patterns 22b within the first side area SA1 and the second side area SA2 of the light guide plate 20 can be formed in a lower density compared to the first pattern 22a within the central area CA of the light guide plate 20. As such, light output from the first and second side areas SA1 and SA2 of the light guide plate 20 can be a lower brightness (or luminance) than that of light output from the central area CA of the light guide plate 20. In accordance therewith, the light leakage phenomenon and brightness non-uniformity in the side areas of the curved surface liquid crystal panel 100 can be prevented or minimized.

In order to prevent light leakage and effectively enhance brightness non-uniformity, the first patterns within the first side area SA1 and the second side area SA2 can be formed in different densities according to their position as shown in FIGS. 3 and 4.

For example, the density of the first patterns 22b arranged in the first side area SA1 can be gradually lowered as they approach the first secondary side surface. Similarly, the density of the first pattern 22b arranged in the second side area SA2 can be gradually lowered as they approach the second secondary side surface.

The first patterns 22B within the first side area SA1 and the second side area SA2 of the light guide plate 20 can be formed in a density range of about 60%~80% compared to the density of the first patterns 22a within the central area CA of the light guide plate 20.

Moreover, the first patterns 22b within the first side area SA1 and the second side area SA2 of the light guide plate 20 can be formed in a sufficiently smaller density than that of the related art patterns on a flat surface panel. As such, the first patterns 22b within the first and second side areas SA1 and SA2 of the light guide plate 20 can control brightness. Such configuration of the first patterns 22 can allow the light leakage phenomenon and brightness non-uniformity being generated in the side areas of the curved surface liquid crystal panel to be effectively prevented or improved.

To return to FIG. 1, the reflection plate 40 positioned under the light guide plate 20 can be disposed on the bottom surface of the lower cover 400. Also, the reflection plate 40 is used to reflect light that has been output in a downward direction from the light guide plate 20 toward the curved surface liquid crystal panel 100. Moreover, the reflection plate 40 can regionally adjust reflection quantity for input light and allow brightness to be uniformly distributed in the entire light output surface of the light guide plate 20.

Such a reflection plate 40 can be formed in the same curved planar shape as the light guide plate 20. As the reflection plate 40, an ESR (enhanced specular reflector) film with a very high reflectance can be used. The ESR film can become one of a silver color film and a white film each having a reflectance of about 98% and a transmittance of about 2%. Such an ESR film can reflect most of input light toward the curved surface liquid crystal panel 100.

The optical sheets 30 can be disposed on the light guide plate 20. The optical sheets 30 can be formed in the same curved surface shape as the light guide plate 20.

Such optical sheets 30 disposed on the light guide plate 20 enhance efficiency of light which is output from the light guide plate 20 and applied to the curved surface liquid crystal panel 100. To this end, the optical sheets 30 can include a diffusion sheet 31 configured to diffuse light output from the light guide plate 20, and a plurality of sheets 32 and 33 configured to concentrate diffused light from the diffusion sheet 31 and apply uniform light to the entire surface of the curved surface liquid crystal panel 100.

In general, a single diffusion sheet 31 is used in the backlight unit 200, but a first prism sheet 32 and a second prism sheet 33 which configured to include prisms crossing perpendicularly to each other in x and y axes are included in the backlight unit 200. The first prism sheet 32 and the second prism sheet 33 can enhance straightness of light by refracting light in the x and y axes.

As shown in FIG. 5, the optical sheets 30 (hereinafter, the second prism sheet 33 will be described as an example) can be defined into a central area CA, a first side area SA1 and a second side area SA2. The central area CA, the first side area SA1 and the second side area SA2 of the second prism sheet 33 can correspond to (or overlapped with) the central area, the first side area and the second side area of the light guide plate 20.

Second patterns 35 can be formed on one surface of the second prism sheet 33. The second pattern 35 can be formed in a prism pattern (or shape). Alternatively, the second pattern 35 can be one of a hemisphere pattern (or shape), a peak pattern (or shape) and a polygonal cone pattern (or shape).

The second patterns 35 can be uniformly arranged in the central area CA, the first side area SA1 and the second side area SA2 of the second prism sheet 33. The second patterns 35 formed in the central area CA, the first side area SA1 and the second side area SA2 of the second prism sheet 33 can enable brightness of the central area CA of the second prism sheet 33 to be different from brightness of the side areas SA1 and SA2 of the prism sheet 33. The brightness of the first side area SA1 and the second side area SA2 can becomes about 70%~90% compared to the brightness of the central area CA.

The second patterns 35a within the central area CA of the second prism sheet 33 can be regularly arranged. Also, the second patterns 35a within the central area CA of the second prism sheet 33 can be formed to have the same height.

The second patterns 35b arranged in the side areas (i.e., the first side area SA1 and the second side area SA2) of the second prism sheet 33 can be formed to have a higher height compared to the second patterns 35a arranged in the central area CA of the second prism sheet 33.

The second patterns 35b arranged in the first side area SA1 and the second side area SA2 of the second prism sheet 33 can enable brightness to be gradually lowered as it approaches the side surface of the second prism sheet. To this end, the second patterns 35b arranged in the first side area SA1 and the second side area SA2 of the second prism sheet 33 can be formed in such a manner as to be gradually lowered in height as they approach the side surfaces of the second prism sheet 33.

In accordance therewith, the light leakage phenomenon and the brightness non-uniformity being generated in the side areas of the curved surface liquid crystal panel 100 can be effectively prevented or improved.

In another manner, the second patterns 35a within the central area CA of the second prism sheet 33 can be formed to each have a different curvature from that of the second patterns 35b within the side areas SA1 and SA2 of the second prism sheet 33, as shown in FIG. 6.

The second patterns 35a within the central area CA of the second prism sheet 33 can be formed to each have a smaller curvature compared to the second patterns 35b within the first side area SA1 and the second area SA2 of the second prism sheet 33.

If the second patterns 35a formed in the central area CA of the second prism sheet 33 have a curvature of about 1, the second patterns 35b formed in the first side area SA1 and the second side area SA2 of the second prism sheet 33 have a curvature range of about 2~8. Also, the second patterns 35b arranged in the first side area SA1 and the second side area SA2 of the second prism sheet 33 can be formed to have gradually enlarged curvature as they approach the side surfaces of the second prism sheet 33.

In still another manner, the second patterns 35a within the central area CA of the second prism sheet 33 can be formed in a different shape from the second patterns 35b within the side areas SA1 and SA2 of the second prism sheet 33, as shown in FIG. 7.

In detail, each of the second patterns 35a within the central area CA of the second prism sheet 33 can be formed in a prism shape (or pattern). Meanwhile, each of the second patters 35b within the first side area SA1 and the second side area SA2 of the second prism sheet 33 can be each formed in a single rectangular shape (or pattern) covering the respective side area SA1 or SA2. The second patterns 35b within the first side area SA1 and the second side area SA2 of the second prism sheet 33 can be formed in the same height as the second patterns 35a within the central area CA of the second prism sheet 33.

In further still another manner, the second patterns 35 can be formed in only a fixed area of the second prism sheet 33. In detail, the second patterns 35 can be formed in only the central area CA of the second prism sheet 33. Each of the second patterns 35 can become a prism pattern (or shape). However, the second patterns 35 are not limited to this. In other words, the second pattern 35 can be formed in a variety of shapes, as shown in FIG. 8.

As the structures shown in FIGS. 6 through 8, the second patterns 35 of the second prism sheet 33 are formed in different shapes according to the areas. In other words, the second patterns 35 of the second prism sheet 33 are formed in different shapes according to whether there are arranged in the central area or the side areas. Therefore, the light leakage phenomenon and the brightness non-uniformity being generated in the side areas of the curved surface liquid crystal panel 100 can be effectively prevented or improved.

Although the structures with the second patterns formed in the second prism sheet corresponding to the uppermost layer has been explained, the present disclosure is not limited to this. In other words, the structures of the second prism sheet can be applied to different prism sheets (i.e., the first prism sheet) and/or the diffusion sheet in the same manner. Actually, the second patterns can be formed on one surface of the first prism sheet or the diffusion sheet in the same manner as those of the second prism sheet.

The curved surface liquid crystal panel 100 and the curved surface backlight unit 200 described above can be stacked on the guide panel 300.

The guide panel 300 can be formed in a rectangular frame (or rim) shape with opened upper and lower surfaces. A stepped portion can be formed in the inner side surface of the guide panel 300. As such, the curved surface backlight unit 200 is disposed in the inner side of the guide panel 300, and the curved surface liquid crystal panel 100 can be disposed on the guide panel 300.

The upper cover 500 and the lower cover 400 is used to receive and fasten the curved surface backlight unit 200 and the curved surface liquid crystal panel 100 which are stacked on the guide panel 300. As such, the inside of the display device can be structurally sealed up.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents without being limited to the description of the present disclosure.

What is claimed is:
1. A curved surface backlight unit comprising:
a light source;
a curved surface light guide plate disposed parallel to the light source;

first patterns on one surface of the light guide plate;
a reflection plate disposed under the light guide plate;
optical sheets disposed on the light guide plate; and
second patterns formed on one surface of at least one of the optical sheets,
wherein the light guide plate is defined into a central area and side areas, the first patterns are more densely formed in the central area rather than the side areas, and the second patterns are arranged in such a manner that brightness in side areas of the optical sheet corresponding to the side areas of the light guide plate becomes about 70%~90% compared to that in a central area of the optical sheet corresponding to the central area of the light guide plate.

2. The curved surface backlight unit of claim 1, wherein the light guide plate includes a first flat surface used to input light, and first and second side surfaces which are bent in a constant curvature and are perpendicular to the first flat surface.

3. The curved surface backlight unit of claim 2, wherein the side areas of the light guide plate includes a first side area adjacent to the first side surface and a second side area adjacent to the second side surface, and the central area of the light guide plate is positioned between the first side area and the second side area.

4. The curved surface backlight unit of claim 3, wherein the first pattern is one of a prism pattern, a hemisphere pattern, a peak pattern and a polygonal cone pattern.

5. The curved surface backlight unit of claim 4, wherein the first patterns arranged in the first side area gradually become lower in density as they approach the first side surface, and the first patterns arranged in the second side area gradually become lower in density as they approach the second side surface.

6. The curved surface backlight unit of claim 5, wherein the first patterns within the first side area and the second side area of the light guide plate are formed in a density range of 60%~90% compared to that of the first patterns within the central area of the light guide plate.

7. The curved surface backlight unit of claim 1, wherein the second patterns arranged in the side areas of the optical sheet have lower heights compared to that of the second patterns within the central area of the optical sheet.

8. The curved surface backlight unit of claim 7, wherein the second patterns arranged in the side areas of the optical sheet gradually become lower in height as they approach respective side surfaces of the optical sheet.

9. The curved surface backlight unit of claim 1, wherein the second patterns arranged in the side areas of the optical sheet have larger curvatures than that of the second patterns arranged in the central area of the optical sheet.

10. The curved surface backlight unit of claim 9, wherein the second patterns arranged in the side areas of the optical sheet have a curvature range of about 2~8 when the second patterns within the central area of the optical sheet have a curvature of 1.

11. The curved surface backlight unit of claim 10, wherein the second patterns within the side areas of the optical sheet gradually become larger as they approach respective side surfaces of the optical sheet.

12. The curved surface backlight unit of claim 1, wherein the second patterns disposed in the side areas of the optical sheet are each formed in a single rectangular pattern covering the respective side area of the optical sheet.

13. The curved surface backlight unit of claim 1, wherein the second patterns are arranged in only the central area of the optical sheet.

14. The curved surface backlight unit of claim 1, wherein the second pattern is one of a prism pattern, a hemisphere pattern, a peak pattern and a polygonal cone.

15. A curved surface display device comprising:
a curved surface liquid crystal display panel; and
a curved surface backlight unit disposed under the curved surface liquid crystal panel and configured to apply light to the curved surface liquid crystal panel,
wherein the curved surface backlight unit includes a light source, a curved surface light guide plate disposed parallel to the light source, first patterns on one surface of the light guide plate, a reflection plate disposed under the light guide plate, optical sheets disposed on the light guide plate, and second patterns formed on one surface of at least one of the optical sheets, and
wherein the light guide plate is defined into a central area and side areas, the first patterns are more densely formed in the central area rather than the side areas, and the second patterns are arranged in such a manner that brightness in side areas of the optical sheet corresponding to the side areas of the light guide plate becomes about 70%~90% compared to that in a central area of the optical sheet corresponding to the central area of the light guide plate.

16. The curved surface display device of claim 15, wherein the first patterns within a first side area and a second side area of the light guide plate are formed in a density range of 60%~90% compared to that of the first patterns within the central area of the light guide plate.

17. The curved surface display device of claim 15, wherein the second patterns arranged in the side areas of the optical sheet have lower heights compared to that of the second patterns within the central area of the optical sheet.

18. The curved surface display device of claim 15, wherein the second patterns arranged in the side areas of the optical sheet have larger curvatures than that of the second patterns arranged in the central area of the optical sheet.

19. The curved surface display device of claim 15, wherein the second patterns disposed in the side areas of the optical sheet are each formed in a single rectangular pattern covering the respective side area of the optical sheet.

20. The curved surface display device of claim 15, wherein the second patterns are arranged in only the central area of the optical sheet.

* * * * *